(12) United States Patent
Connolly et al.

(10) Patent No.: US 9,240,905 B2
(45) Date of Patent: Jan. 19, 2016

(54) PROTECTING HYBRID EQUIPMENT IN A NETWORK NODE

(71) Applicant: Ciena Corporation, Hanover, MD (US)

(72) Inventors: Matthew W. Connolly, Canton, GA (US); Jeffrey Scott Moynihan, Cumming, GA (US); John Oltman, Atlanta, GA (US)

(73) Assignee: Ciena Corporation, Hanover, MD (US)

( * ) Notice: Subject to any disclaimer, the term of this patent is extended or adjusted under 35 U.S.C. 154(b) by 270 days.

(21) Appl. No.: 13/947,916

(22) Filed: Jul. 22, 2013

(65) Prior Publication Data

US 2015/0023368 A1    Jan. 22, 2015

(51) Int. Cl.
*H04L 12/64* (2006.01)
*H04L 12/709* (2013.01)
*H04L 12/66* (2006.01)

(52) U.S. Cl.
CPC ............. *H04L 12/6402* (2013.01); *H04L 12/66* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 8,259,733 B2 | 9/2012 | Conklin et al. | |
| 8,289,879 B2 | 10/2012 | Brown | |
| 8,417,111 B2 | 4/2013 | Moynihan et al. | |
| 8,457,001 B2 | 6/2013 | Madrahalli et al. | |
| 8,467,375 B2 | 6/2013 | Blair | |
| 2007/0160068 A1* | 7/2007 | Connolly et al. ............. | 370/399 |
| 2007/0237172 A1* | 10/2007 | Zelig ..................... | H04L 45/245 370/465 |
| 2008/0037418 A1* | 2/2008 | Cole et al. ...................... | 370/220 |
| 2008/0089226 A1* | 4/2008 | Konuma et al. ............... | 370/219 |
| 2008/0285555 A1* | 11/2008 | Ogasahara ..................... | 370/389 |
| 2008/0291826 A1* | 11/2008 | Licardie et al. ............... | 370/230 |
| 2009/0245097 A1* | 10/2009 | Takakuwa ..................... | 370/217 |
| 2010/0215042 A1* | 8/2010 | Sato ....................... | H04L 12/413 370/392 |
| 2011/0170860 A1* | 7/2011 | Smith et al. ..................... | 398/25 |
| 2011/0292788 A1* | 12/2011 | Tsuchiya ...................... | 370/218 |
| 2012/0155872 A1* | 6/2012 | Kakadia ................ | H04J 3/1658 398/58 |
| 2013/0170832 A1* | 7/2013 | Tochio ............................ | 398/45 |
| 2013/0259465 A1* | 10/2013 | Blair ..................... | H04B 10/27 398/2 |
| 2014/0071825 A1* | 3/2014 | Chhabra ................. | G06F 13/24 370/236 |

OTHER PUBLICATIONS

Rec. ITU-T G.873.1 (Jul. 2011) Series G: Transmission Systems and Media, Digital Systems and Networks: Digital networks—Optical transport networks. Optical Transport Network (OTN): Linear protection. p. 1-30.

(Continued)

*Primary Examiner* — Dung B Huynh
(74) *Attorney, Agent, or Firm* — Clements Bernard PLLC; Christopher L. Bernard; Lawrence A. Baratta, Jr.

(57) ABSTRACT

The disclosure generally relates to mechanisms to protect hybrid networking equipment at a port level granularity and thereby provide capabilities to specify the protection of client services on a port-by-port basis. For example, in one embodiment, a Virtual Connection Point (VCP) may be established as a termination point for a transport-side network connection and configured as a Layer 1 bridge/select connection to switch among any one of a plurality of backplane Layer 1 termination points. The plurality of backplane Layer 1 termination points may be protected using a link aggregation group, wherein a Layer 2 switch may be established to direct packets between the link aggregation group and the VCP configured as the Layer 1 bridge/select connection.

18 Claims, 7 Drawing Sheets

(56) References Cited

OTHER PUBLICATIONS

Rec. ITU-T G.709/Y.1331 (Feb. 2012) Series G: Transmission Systems and Media, Digital Systems and Networks: Digital terminal equipments—General. Series Y: Global Information Infrastructure, Internet Protocol Aspects and Next-Generation Networks: Internet protocol aspects—Transport. Interfaces for the optical transport network. p. 1-238.

Cisco CPT Configuration Guide—CTC and Documentation Release 9.5.x and Cisco IOS Release 15.2(01). Configuring Link Aggregation Group and Link Aggregation Control Protocol. p. 1-30.

COREDIRECTOR® FS Multiservice Optical Switch, COREDIRECTOR® FSCI Multiservice Optical Switch, Release 6.2, System Description Manual. Ciena Part No. 009-2010-330, Jun. 2012, Revision D. Copyright© 2012 Ciena® Corporation. p. 1-316.

\* cited by examiner

PROTECTING HYBRID EQUIPMENT IN A NETWORK NODE

FIELD OF DISCLOSURE

The disclosure generally relate to networking systems, and in particular, to approaches for protecting equipment having both packet traffic flows and Time Division Multiplexed (TDM) traffic paths which are processed in hybrid networking nodes.

BACKGROUND

OTN (Optical Transport Network) is a standard which defines an encapsulation protocol permitting the optical transmission of a wide variety of different signals over a common optical medium. OTN provides the flexibility for transparently multiplexing and mapping synchronous and/or asynchronous client signals (each of which may be represented in their own standard protocols) over fiber-optic networks, including optical networks employing Wavelength Division Multiplexing (WDM). The OTN standard was developed by the ITU-T, which defines OTN as a set of Optical Network Elements (hereinafter referred to as "nodes") connected by optical fiber links, able to provide the functionality of transport, multiplexing, switching, management, supervision, and survivability of optical channels carrying client signals. ITU-T Recommendation G.709, entitled "Interfaces for the Optical Transport Network," defines various aspects of OTN, which may be referred to as a "digital wrapper" technology that defines a layer hierarchy for payload encapsulation, Operations, Administration, and Maintenance (OAM) overhead, forward error correction (FEC), and multiplexing. The result is a transport standard that includes the benefits of Synchronous Optical Networking (SONET) and Synchronous Digital Hierarchy (SDH) protocols (e.g., resiliency and manageability) but with improvements for transporting asynchronous data payloads such as Ethernet. Accordingly, OTN was specifically designed to be a multi-service transport container for essentially any type of data service, from TDM to packet, and this flexibility is one of OTN's advantages. OTN has been widely deployed for transport within long-haul networks (referred to herein as "transport networks"), particularly because OTN's inherent FEC features enable reliable optical transmission over longer distances.

FIG. 1 shows a simplified diagram of an exemplary OTN layer hierarchy 100 and its associated frame structures 150 defined in ITU-T Recommendation G.709. The OTN layer hierarchy 100 may be broadly divided into four layers: classified as Layer 3 (L3), Layer 2 (L2), Layer 1 (L1), and Layer 0 (L0). Layer 3 may include various packet-based protocols such as Transmission Control Protocol/Internet Protocol (TCP/IP) and Multiprotocol Label Switching (MPLS). Layer 2 may include Ethernet, ATM, and Fibre Channel. Layer 1 can include SONET/SDH, and OTN sub-layers Optical Payload Unit (OPUk) 104, Optical Data Unit (ODUk) 106, and Optical Transport Unit (OTUk) 108. Layer 0 may include OTN sub-layer Optical Channel (OCh) 109. Because various OTN sub-layers may exchange data using a variety of different rates (e.g., OTU1, OTU2, OTU3, and ODU0), these rates may be collectively referred to as having a "k" appended to the appropriate frame's acronym, such as "ODUk" and "OTUk."

Further referring to the OTN Layer Hierarchy 100, Layer 3, Layer 2, and Layer 1 may operate on their respective data units in the electrical domain, while Layer 0 may operate in the optical domain. End user services, which are referred to herein as "Clients" 102, may include IP, MPLS, Ethernet, ATM, FC, SONET/SDH, etc., and thus the Clients 102 may span multiple layers (e.g., L0 through L3).

Typically, Layer 3 and Layer 2 may be associated with packet switching networks, which are also known as connectionless networks. In a connectionless network, traffic flow may traverse one or more network paths between predefined endpoints, where the paths traversed by the traffic flows between the predefined endpoints are not pre-specified. Layer 1 and Layer 0 can be associated with connection-oriented networks, such as circuit switched and/or virtual circuit switched networks having a predefined traffic path, which may utilize Time Division Multiplexing (TDM) over both electrical (L1) and optical (L0) physical channels.

Further referring to FIG. 1, the OTN layer hierarchy 100 can be associated with the OTN Frame Structures 150. The end user services may provide a Client signal frame 152 in a variety of different protocols to the OPUk sub-layer 104. The Client signal frame 152 may include signals using synchronous networking protocols, such as SONET and SDH, and/or asynchronous protocols, such as ATM, Ethernet, and/or Fibre Channel. The OPUk sub-layer 104, which contains all the timeslots in the OTN frame, may encapsulate the Client signal frame 152, and add OPUk overhead, to produce an OPUk frame 154. The Client signal frame 152 is essentially unmodified by the network, aside from being mapped at the source node and demapped at the sink node. The ODUk sub-layer 106, which provides path level transport functions, receives the OPUk frame 154, appends its own ODUk overhead, and encapsulates the OPUk frame 154 to produce an ODUk frame 156. The OTUk sub-layer 108, which provides section-level overhead, receives the ODUk frame 156, appends its own OTUk overhead and Forward Error Correction (FEC) information, and encapsulates the ODUk frame 156 to produce an OTUk frame 158. The OCh layer 109 serializes a plurality of OTUk frames 158, and appends its own overhead to produce the OCh frame 159.

FIG. 2 shows a top level block diagram of a node 200 which may perform networking functions at different layers. The node 200, for example, may function as a dual purpose switch (such as, for example, a carrier class Ciena 5400 series switch), that can simultaneously perform switching on both Layer 1 traffic paths and Layer 2 traffic flows. Such nodes 200 may be referred to herein as a hybrid switch. Node 200 can provide switching functionality to interface client services with transport networks, which are typically Wide Area Networks (WANs). For example, one application could be to provide connectivity between a backhaul network and one or more cell towers, and thus provide Ethernet services from cell towers through the transport network (e.g., an OTN/SONET/SDH optical network).

The node 200 may include a plurality of line modules 205, 210, and 230 having client-side ports (206, 211, 231) for transferring data with a variety of different client services over fiber and/or wire connections (as indicated by solid double-arrow lines in FIG. 2). The line modules 205, 210, and 230 may communicate to at least one hybrid switching module 220 over a backplane connection (also referred to herein as "backplane") represented by the thin dotted lines shown in FIG. 2. The node 200 may further include at least one line module 240 having transport-side ports 241 for communicating over the transport network. Data may be transferred between the hybrid switching module 220 and the line module 240 over the backplane connection. As described in more detail below, node 200 may process both L1 traffic paths, such as OTN Subnetwork Connections (SNCs), and L2 traffic flows, such as Ethernet transfers, in a parallel manner. In FIG.

2, the L1 traffic paths are illustrated in heavy gray dotted lines, and the L2 traffic flows are illustrated in heavy gray solid lines.

The hybrid switching module 220 that may utilize a plurality of switch fabrics which can simultaneously perform switching at different layers. For example, the hybrid switching module 220 may utilize a converged L1/L2 switch fabric. The converged L1/L2 switch fabric can operate using parallel L1/L2 fabrics having a plurality of ASICs, and/or a single fabric ASICs with multiple fabric capability. FIG. 2 illustrates the hybrid switching module 220 operating using two parallel fabrics, where the L1 switch fabric 222 operates on the L1 traffic paths, and the L2 switch fabric 226 operates on the L2 traffic flows. Regardless of the ASIC implementation, the hybrid switching module 220 may supports backplane interfaces both separate L1 and L2 connections, and hybrid cards having dual L1/L2 fabric interfaces.

Line module 240 may be referred to as a transport-side line module and can include one or more optical services line modules and/or Dense Wavelength Division Multiplexing (DWDM) modules. The transport-side line module 240 may transfer data over L1 traffic paths between the hybrid switching module 220 and the transport network. The L1 traffic paths may be provided over the backplane connection. In one aspect, the transport-side line module 240 may receive ODUk frames from the hybrid switching module 220, and transform the ODUk frames into OTUk frames for transmission over a transport-side port 241, and subsequent transmission over the transport network. In the reverse direction, the transport-side line module 240 may receive OTUk frames from the transport network over the transport-side port 241, convert the OTUk frames to ODUk frames, and send the ODUk frames over the backplane connection to the hybrid switching module 220 through the L1 switch fabric.

Further referring to FIG. 2, the node 200 may include a plurality of client-side modules 205, 210, and 230 for transferring various signals between the hybrid switching module 220 and various client services. For example, node 200 may include one or more client-side optical services line modules 205, having client-side (also referred to herein as "front-side") L1 ports 206 supporting L1 traffic paths, which can include support for various SONET, SDM and OTN optical data frames, and can include ports for client services such as OC192, OTU2, OTU3, OC768, etc. The optical services line module 205 may transfer L1 traffic with the hybrid switching module 220 over a backplane connection using the L1 switch fabric 222. The L1 switch fabric 222 may provide L1 traffic from the optical services line module 205 to the transport-side optical services line module 240 for subsequent transmission over the transport network. In the reverse direction, L1 traffic may be received by the transport-side optical services line module 240 from the transport network, and switched to the client-side optical services line module 205 through the L1 switch fabric 222. Alternatively, as will be explained in more detail below, L1 traffic may be exchanged between the client-side optical services line module 205 and a hybrid services line module 230 via the L1 switch fabric 222.

Additionally, node 200 may include one or more client-side packet services line modules 210 for supporting L2 traffic flows, which can include support for various Ethernet or other packet-based services. The packet services line module 210 may include client-side ports 211 for Ethernet client services such as 100 GbE, 10 GbE, etc. The packet services line module 210 may transfer L2 traffic between the hybrid switching module 220 over a backplane connection, where the L2 traffic may be natively switched by the L2 switch fabric 226. The L2 traffic flows may be switched to other modules supporting packet services. For example, as shown in FIG. 2, the hybrid services line module 230 may support packet services and have client-side ports 231 which support Ethernet, and thus can exchange L2 flows with the packet services line module 210. Moreover, as will be described in more detail below, L2 traffic flows from the packet services line module and may be converted to L1 traffic paths for switching on the L1 switch fabric 222.

Further referring to FIG. 2, node 200 may also include hybrid equipment such as, for example, the client-side hybrid services line module 230 which may process both L1 traffic paths and L2 traffic flows. In the embodiment shown in FIG. 2, the hybrid services line module 230 may be an Ethernet Services Line Module (ESLM) having client-side Ethernet ports 231. The client-side ports 231 may support, for example, 10 GbE, 100 GbE, and/or NxGbE client services. As shown in FIG. 2, L2 traffic flows (e.g., Ethernet packets) may be switched directly at Layer 2 between packet services line module 210 and the hybrid services line module 230. Specifically, L2 traffic flows at the hybrid services line module 230 can be transferred through an Ethernet PHY/MAC module 234, and further processed (e.g., encapsulated into L2 frames) by packet processor (PP) 236. The processed L2 traffic flow may further be exchanged over the L1/L2 fabric interface 232 and provided over the backplane connection associated with the L2 switch fabric 226 in the hybrid switching module 220. The L2 switch fabric 226 may switch the L2 traffic flow between the hybrid services line module 230 and the packet services line module 210. Alternatively, L2 traffic flows, which may be associated with either the client-side ports 231 or the L2 switch fabric 226, may be mapped by the packet processor 236 into L1 traffic paths and provided to backplane L1 termination points 238 (also referred to herein as "backplane ports"). For example, as shown in FIG. 2, by using General Framing Procedure (GFP), the L2 traffic flows (e.g., Ethernet packets) may be mapped by packet processor 236 to ODUk frames (e.g., according to a frame structure defined in ITU-T Recommendation G.709), and provided to the backplane L1 termination points 238. The L1 traffic paths may be transferred over the backplane connection associated with the L1 switch fabric 222 via L1/L2 fabric interface 232. The L1 traffic paths may be switched with client-side optical services module 205, or transport-side optical services line module 240 for subsequent transfer over the transport network. For all of the L1 traffic paths and L2 traffic flows shown in FIG. 2, the traffic may be exchanged bidirectionally. So for example, L1 traffic received over the transport network via the transport-side optical services line module 240 may be switched over the L1 switch fabric 222 to the backplane L1 termination points 238 via the L1/L2 fabric interface 232. The L1 frames may be mapped to L2 traffic flows by packet processor 236, and provided to the L2 switch fabric 226 via the L1/L2 fabric interface 232, for switching L2 traffic flows to/from the packet services line module 210.

Because of the independent backplane connections to both the L1 switch fabric 222 and the L2 switch fabric 226 provided by the hybrid services line module 230, the backplane L1 termination points 238 may be exposed as logical ports on the L2 switch fabric 226 and simultaneously serve as termination points for L1 traffic paths (e.g., Generalized Multiprotocol Label Switching (GMPLS) Label Switched Path (LSP) endpoints, or Optical Signal Routing Protocol (OSRP) Sub-network Connection (SNC) endpoints. It is possible that the hybrid services line module 230 have a relatively large number of backplane L1 termination points. For example, the Ciena 5400 series switch can have up 80 ODU0 Connection Termination Points (CTPs) provisioned on a single card.

While the multiple layer architecture of the hybrid switching module 220 and the hybrid services line module 230 provides switching flexibility, the combination of simultaneous L1 traffic paths and L2 traffic flows can complicate protecting the hybrid services line module 230. As used herein, "protecting" networking equipment refers to configuring the equipment so that a component and/or sub-component failure does not stop or unduly restrict the flow of network traffic. Protecting network equipment typically involves configuring the equipment with some level of redundancy so that network traffic is maintained at a specified level within a specified period of time from the failure event. For example, with traditional Ethernet switches, equipment can be protected using IEEE 802.3 link aggregation groups (LAGs), which can provide protection at the port level by allocating resources among work ports (i.e., utilized for traffic flows under normal conditions) and protect ports (i.e., utilized for traffic flows when the work ports experience a failure). Another option is to configure an entire card as a dedicated hot standby, where all provisioning is duplicated on a protect card. The LAG approach may be more common since it can provide port level allocation of protection resources, thus providing greater flexibility. For example, some ports on the card may be used for unprotected services, while other services can be afforded varied levels of protection on a port-by-port basis.

In the case of the hybrid services line module 230, a one-to-one relationship between the work and protect ports may not exist, as the L2 traffic flows transferred within the hybrid services line module 230 can may be split L2 traffic flows and L1 traffic paths. Additionally, the backplane L1 termination points 238 (e.g., the backplane ODUk ports), which are exposed as logical L2 termination ports to the L2 switch fabric 226, also should be taken into consideration in any protection scheme. A conventional LAG (such as one using active redundancy (1+1) or passive redundancy (1:n)) that includes the backplane L1 termination points 238 (e.g., backplane ODUk ports) may have the disadvantage of utilizing redundant connections through the transport network (e.g., redundant OTN trunks), thus driving down network utilization. Moreover, additional LAGs across the transport network may be unnecessary given different approaches for protecting the transport network which may already be in place (e.g., Automatically Switched Optical Network (ASON) and/or Generalized Multi-Protocol Label Switching (GMPLS)). Accordingly, traditional LAGs may not be optimal if only a single L1 traffic path (e.g., ODU SNC) is desired. Alternatively, protection may be afforded by utilizing an additional "hot standby" hybrid services line module 230 in node 200; however, this approach can result in increased equipment cost and reduced line module utilization.

SUMMARY

The following presents a simplified summary relating to one or more aspects and/or embodiments associated with the approaches disclosed herein to protect hybrid equipment in a network node. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the approaches disclosed herein to protect hybrid equipment in a network node in a simplified form to precede the detailed description presented below.

According to one exemplary aspect, the approaches disclosed herein may be used to protect hybrid networking equipment at a port level granularity, which may provide capabilities to specify the protection of client services on a port-by-port basis. For example, in one embodiment, logical Ethernet ports may be assigned to backplane Layer 1 termination points (e.g., backplane Optical Data Unit logical Ethernet ports) and a Link Allocation Group having the logical Ethernet ports as members may be established to accomplish the protection. This approach can utilize an IEEE 802.3 standard link aggregation, such as, for example, a (1+1) LAG configuration. However, unlike a traditional LAG, various embodiments disclosed herein may not utilize a far-end link peer in the transport network. Instead, the LAG group may be "single-ended" and the members of the LAG group may be connected to a bridge/select connection. As such, this approach may prevent duplicate work/protect tunnels from going out across the transport network and potentially decreasing traffic utilization in the transport network. In one embodiment, the bridge/select connection may be a Subnetwork Connection Point (SNCP) selector in the Layer 1 switch fabric, which may extend typical implementations that provide a (1+1) bridge and select function to the LAG members to support (1:n) protection. Furthermore, the single-ended LAG group may disable both the Link Aggregation Control Protocol (LACP) and the marker protocols, whereby no Link Aggregation Control Protocol Data Units (LACPDUs) are transmitted or expected through the transport network (e.g., the OTN tunnel). Load balancing may be disabled, and the LAG may run in a 1+1 (100:0) configuration with the protect interface in a STANDBY state.

According to one exemplary aspect, a Virtual Connection Point (VCP) may be realized in the Layer 1 switch fabric to protect the hybrid networking equipment. For example, in one embodiment, the VCP may be realized in a center stage of a Clos switch and attached to a common leg of the bridge/select connection point, or the VCP can provide the above-mentioned bridge/select function. In either case, the VCP may generally provide a termination point for the Layer 1 traffic path (e.g., the OTN SNC or LSP tunnel).

According to one exemplary aspect, a method for providing port level protection for a hybrid interface may comprise establishing a Virtual Connection Point (VCP) as a termination point for a transport-side network connection (e.g., in a center stage of a three-stage Clos switch in a Layer 1 switch fabric), configuring the VCP as a Layer 1 bridge/select connection to switch among any one of a plurality of backplane Layer 1 termination points, creating a link aggregation group to protect the plurality of backplane Layer 1 termination points (e.g., a single-ended link aggregation group that lacks a far-end peer and runs in a link aggregation group (1+1) configuration), and establishing a Layer 2 switch to direct packets between the link aggregation group and the VCP configured as the Layer 1 bridge/select connection. Furthermore, in one embodiment, logical Ethernet ports may be assigned to Layer 1 termination points, wherein members in the link aggregation group may include the logical Ethernet ports to protect the backplane Layer 1 termination points. In one embodiment, the link aggregation group may comprise a first link aggregation group and the method may further comprise creating a second link aggregation group to protect one or more client-side Ethernet ports, wherein the Layer 2 switch may further direct packets between the first and second link aggregation groups.

According to one exemplary aspect, a node for providing port level protection for a hybrid interface may comprise at least one control module, at least one switching module having switch fabrics that can independently function at both Layer 1 and Layer 2, and at least one hybrid services line module functionally coupled to the at least one control module and the at least one switch module through a backplane. Furthermore, the node may comprise at least one processor configured to establish a Virtual Connection Point (VCP) in the at least one switching module as a termination point for a transport-side network connection, configure the VCP as a Layer 1 bridge/select connection to switch among any one of a plurality of backplane Layer 1 termination points, create a link aggregation group to protect the backplane Layer 1 termination points, and establish a Layer 2 switch to direct packets between the link aggregation group and the VCP configured as the Layer 1 bridge/select connection. In one embodiment, the at least one processor may be further configured to assign logical Ethernet ports to Layer 1 termination points, wherein members in the link aggregation group may include the logical Ethernet ports to protect the backplane Layer 1 termination points. Furthermore, in one embodiment, the link aggregation group may comprise a first link aggregation group and the at least one processor may be further configured to create a second link aggregation group to protect one or more client-side Ethernet ports, wherein the Layer 2 switch may be further configured to direct packet between the first and second link aggregation groups.

Other objects and advantages associated with the approaches disclosed herein to protect hybrid equipment in a network node will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
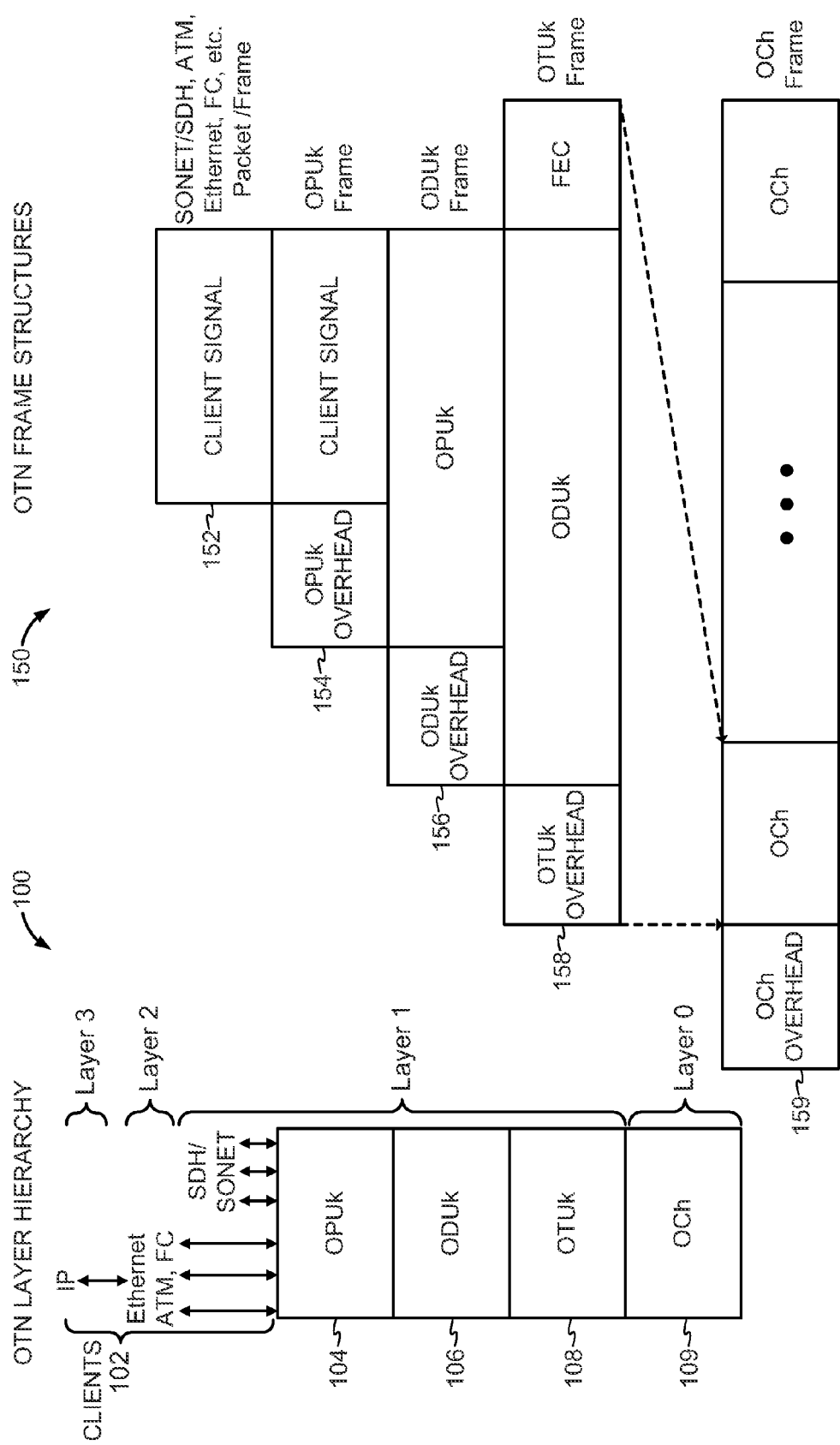
FIG. 1 illustrates an exemplary Optical Transport Network (OTN) layer hierarchy and associated frame structures.

Various aspects are disclosed in the following description and related drawings to show specific examples relating to exemplary embodiments that may protect hybrid equipment in a network node. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Various aspects disclosed herein relate to approaches to protect hybrid networking equipment at a port level granularity, which may provide capabilities to specify the protection of client services on a port-by-port basis. For example, in one embodiment, logical Ethernet ports may be assigned to backplane L1 termination points (e.g., backplane ODUk logical Ethernet ports) and a Link Allocation Group having the logical Ethernet ports as members may be established to accomplish the protection. This approach can utilize an IEEE 802.3 standard link aggregation, such as, for example, a (1+1) LAG configuration. However, unlike a traditional LAG, various embodiments disclosed herein may not utilize far-end link peer in the transport network. Instead the LAG group may be "single-ended" and the members of the LAG group may be connected to a bridge/select connection. As such, this approach may prevent duplicate work/protect tunnels from going out across the transport network and potentially decreasing traffic utilization in the transport network. In one embodiment, the bridge/select connection may be a Subnetwork Connection Point (SNCP) selector in the L1 switch fabric, which may extend typical implementations that provide a (1+1) bridge and select function to the LAG members to support (1:n) protection. Furthermore, the single-ended LAG group may disable both the Link Aggregation Control Protocol (LACP) and the marker protocols, whereby no Link Aggregation Control Protocol Data Units (LACPDUs) are transmitted or expected through the transport network (e.g., an Optical Transport Network (OTN) tunnel). Load balancing may be disabled, and the LAG may run in a 1+1 (100:0) configuration with the protect interface in STANDBY state.

Another aspect relating to the approaches disclosed herein to protect hybrid equipment in a network node may include utilizing a Virtual Connection Point (VCP) realized in the L1 switch fabric to protect the hybrid networking equipment. For example, in one embodiment, the VCP may be realized in a center stage of a Clos switch and attached to a common leg of the bridge/select connection point, or the VCP can provide the above bridge/select function. In either case, the VCP may generally provide a termination point for the L1 traffic path (e.g., the OTN SNC or LSP tunnel).

Figure 3:
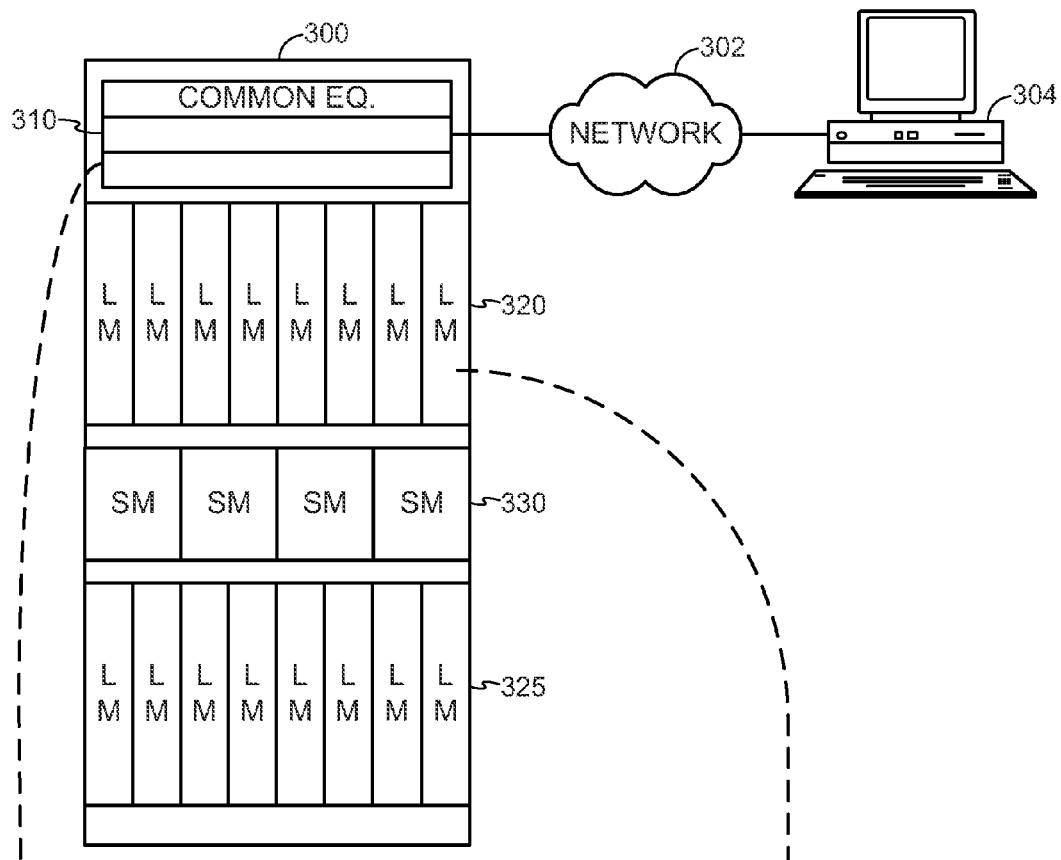
FIG. 3 illustrates an exemplary node that may be configured to provide port level protection for a hybrid network interface.

FIG. 3 is a block diagram of a node 300 which may be configured to provide port level protection for a hybrid network interface. The node 300 may be embodied by an optical switch utilizing Synchronous Optical Networking (SONET), Synchronous Digital Hierarchy (SDH), OTN, and the like. The node 300 may consolidate the functionality of a multi-service provisioning platform (MSPP), SONET/SDH digital cross connect (DCS), Ethernet and Optical Transport Network (OTN) switch, dense wave division multiplexed (DWDM) platform, etc. into a single, high-capacity switching system providing Layer 0, 1, and 2 consolidation. Generally, the node 300 may include common equipment 310, which may further include control modules and timing modules, client-side line modules (LM) 320, switch modules (SM) 330, and transport-side line modules 325. The client-side line modules may include at least one hybrid services line module.

The common equipment 310 may include power, a control module (CM) 512 (shown in detail in FIG. 5), a timing module (not shown), operations, administration, maintenance, and provisioning (OAM&P) access, and the like. For example, the common equipment 310 may connect to a management system 304 through a data communication network 302. The management system 304 may include a network management system (NMS), element management system (EMS), or the like. Additionally, the common equipment 310 may include a control plane processor configured to operate the control plane and the systems and methods described herein with regard to invalid defect suppression. The client-side line modules 320 may be communicatively coupled to the switch modules 330, such as through a backplane, midplane, or the like. The client-side line modules 320 and transport-side line modules 325 may be configured to provide ingress and egress to the switch modules 330, and are configured to provide interfaces for the OTN services described herein. In an exemplary embodiment, the client-side line modules 320 and the transport-side line modules 325 may form ingress and egress switches with the switch modules 330 as center stage switches for a three-stage switch (e.g., a three-stage Clos switch). The client-side line modules 320 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, ODU4), etc. Further, the client-side line modules 320 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The transport-side line modules 325 may include DWDM interfaces, short reach interfaces, and the like, and may connect to a transport network which could include other line modules on remote switch, nodes, end clients, and the like. From a logical perspective, the client-side line modules 320 and transport-side line modules 325 provide ingress and egress ports to the node 300, and each client-side line module 320 and transport-side line module 325 may include one or more physical ports. Further, the node 300 may include software and the like to create, establish, and track logical objects such as connection termination points, trail termination points, etc. associated with the client-side line modules 320, transport-side line modules 325, and switch modules 330.

The switch modules SM 330 may be hybrid switch modules configured to switch services between the client-side line modules (LM) 320 in a plurality of different layers (e.g., having one or more switch fabrics which and independently perform switching at Layer 1 and Layer 2). Additionally, the switch modules 330 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Pay load Virtual Containers (OPVCs), etc.; Ethernet granularity; and the like. Specifically, the switch modules 330 may include both Time Division Multiplexed (TDM) and packet switching engines. The switch modules 330 may include redundancy as well, such as 1:1, 1:N, etc. In an exemplary embodiment, the client-side line modules 320 and the transport-side line modules 325 and the switch modules 330 may be configured to manage and provide SONET, SDH, and OTN line signals. Accordingly, the client-side line modules 320, the transport-side line modules 325, and the switch modules 330 may be line terminating in terms of SONET, SDH, and OTN overhead.

Figure 4:
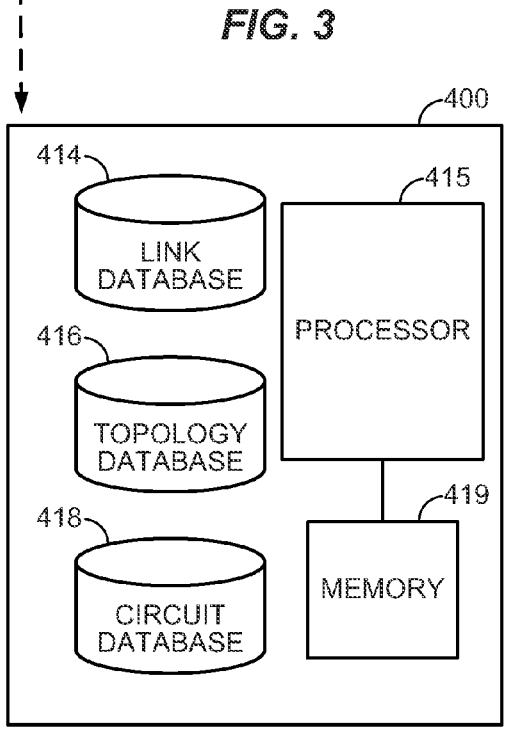
FIG. 4 illustrates an exemplary control module associated with a node that may provide port level protection for a hybrid network interface.

FIG. 4 shows a block diagram of an embodiment of a control module (CM) 400 associated with the node 300. One or more control modules 400 may be part of the common equipment 310 in the node 300 as shown in FIG. 3. The control module 400 may include a processor 415 which may be a hardware device for executing software instructions stored in an associated memory 419. The processor 415 may be any custom made or commercially available processor, a central processing unit (CPU), an auxiliary processor among several processors associated with the control module 400, a semiconductor-based microprocessor (in the form of a microchip or chip set), or generally any device for executing software instructions. Alternatively, processor 415 may be a custom designed ASIC. When the control module 400 is in operation, the processor 415 can be configured to execute software stored within memory 419, to communicate data to and from the memory 419, and/or to generally control operations of the control module 400 pursuant to the software instructions.

The control module 400 may also include network interfaces to enable the control module 400 to communicate on a network, such as to communicate control plane information to other control modules. The network interfaces may include, for example, an Ethernet card (e.g., 10BaseT, Fast Ethernet, Gigabit Ethernet) or a wireless local area network (WLAN) card (e.g., 802.11a/b/g). The network interfaces may include address, control, and/or data connections to enable appropriate communications on the network. The memory 419 may be used to store data, such as control plane information received from other nodes, and/or their control modules, etc. The memory 419 may include any of volatile memory elements (e.g., random access memory (RAM) such as DRAM, SRAM, SDRAM, etc.), nonvolatile memory elements (e.g., ROM, hard drive, tape, CDROM, etc.), and combinations thereof. Moreover, the memory 419 may incorporate electronic, magnetic, optical, and/or other types of storage media. Note that the memory may have a distributed architecture, where various components are situated remotely from one another, but may be accessed by the processor.

The control module 400 may further include a link database 414, a topology database 416, and/or a circuit database 418 functionally coupled to processor 415. The control module 400 may be responsible for all control plane processing associated with the node 300, and further perform invalid defect suppression when OOF conditions occur within the network. For example, the control plane may include OSRP, ASON, G-MPLS, or the like. It may perform many functions such as automatic resource discovery, distributing network resource information, establishing and restoring connections dynamically across the network, and the like. However, the present disclosure is not limited to OSRP, as other intelligent signaling and routing protocols that can (or can be modified to) provide similar functionality as OSRP (e.g., automatically establishing and restoring connections across the network) may be used.

The databases 414, 416, 418 may be stored in the memory and/or some other memory 419. The link database 414 includes updated information related to each link in a network. The topology database 416 includes updated information related to the network topology, and the circuit database 418 includes a listing of terminating circuits and transiting circuits at a node where the control module 400 is located. The control module 400 may utilize control plane mechanisms to maintain the databases 414, 416, 418. For example, a HELLO protocol can be used to discover and verify neighboring ports, nodes, protection bundles, and the like. Also, the databases 414, 416, 418 may share topology state messages to exchange information to maintain identical data. Collectively, the processor 415 and the databases 414, 416, 418 may be utilized to advertise topology information, capacity availability, create and manage trail termination points, and provide connection management (provisioning and restoration). For example, each link in a network may have various attributes associated with it, such as, for example, line protection, available capacity, total capacity, administrative weight, protection bundle identification, delay, and the like. The processor 415 and the databases 414, 416, 418 may be configured to provide automated end-to-end provisioning.

Further, the control module 400 is configured to communicate to other control modules in other nodes on the network. This communication may be either in-band or out-of-band. In an exemplary embodiment, the approaches disclosed herein to protect hybrid equipment in a network node may use an in-band signaling mechanism utilizing SONET, SDH, or OTN overhead. The General Communication Channels (GCC) defined in ITU-T Recommendation G.709 are in-band side channel used to carry transmission management and signaling information within OTN elements. The GCC channels include GCC0 and GCC 1/2. GCC0 are two bytes within Optical Channel Transport Unit-k (OTUk) overhead that are terminated at every 3 R (Re-shaping, Re-timing, Re-amplification) point. GCC1/2 are four bytes (i.e., each of GCC1 and GCC2 include two bytes) within Optical Channel Data Unit-k (ODUk) overhead. In various embodiments, GCC0, GCC1, GCC2 or GCC 1+2 may be used for in-band signaling or routing to carry control plane traffic. Based on the intermediate equipment's termination layer, different bytes may be used to carry control plane traffic. If the ODU layer has faults, it has been ensured not to disrupt the GCC 1 and GCC2 overhead bytes and thus achieving the proper delivery control plane packets.

Figure 5:
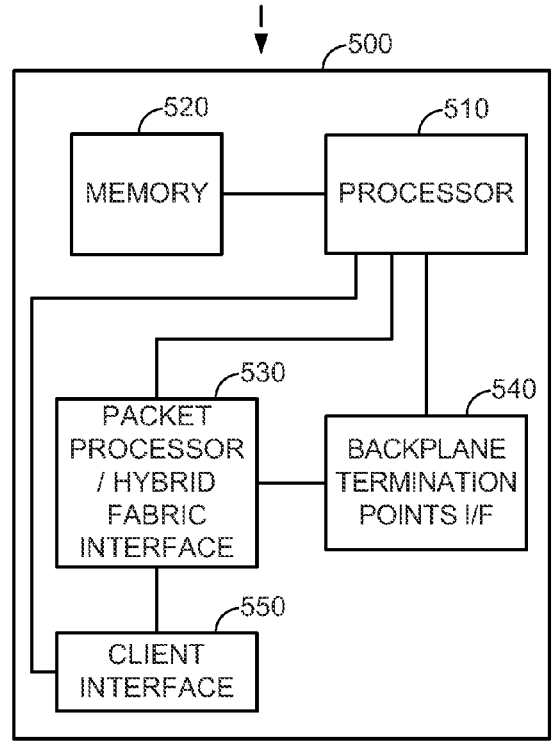
FIG. 5 illustrates an exemplary hybrid services line module associated with a node that may provide port level protection for a hybrid network interface.

FIG. 5 shows a block diagram of an embodiment of a hybrid services line module 500. The hybrid services line module 500 may be client-side line module 320 associated with the node 300 as shown in FIG. 3. The hybrid services line module 500 may include a processor 510 which may be a hardware device for executing software instructions stored in an associated memory 520. The processor 510 may be any custom made or commercially available processor, a central processing unit (CPU), an auxiliary processor among several processors associated with the hybrid services line module 500, a semiconductor-based microprocessor (in the form of a microchip or chip set), or generally any device for executing software instructions. Alternatively, processor 510 may be a custom designed ASIC. When the hybrid services line module 500 is in operation, the processor 510 can be configured to execute software stored within memory 520, to communicate data to and from the memory 520, and/or to generally control operations of the hybrid services line module 500 pursuant to the software instructions. For example, the processor 510 may execute instructions for configuring the hybrid services line module 500, and one or more switch modules 330, to provide port-level protection. Processor 510 may work in conjunction with configuration commands and/or data provided by the processor 415 in control module 400, and/or the management system 304, for configuring itself and other components (e.g., switch modules 330) of node 300 to provide itself with protection having port-level granularity. In other words, the processor 510, the processor 415 in control module 400, the management system 304, and/or the switch modules 330 of node 300 may all be involved in the port-level protection configuration.

The hybrid services line module 500 may also include a packet processor/hybrid fabric interface 530, which may be implemented on an ASIC and/or a general purpose processor. The packet processor may map packets and/or frames between L1 and L2 layers based on General Framing Interface and ITU-T Recommendation G.709. For example, the packet processor may map Ethernet packets to/from ODUk frames based upon the direction of traffic. The hybrid fabric interface may provide independent backplane connections to one or more switch fabrics in the switching module(s) 330. The backplane L1 termination points interface 540 may provide support for L1 termination points (e.g., ODUk termination points) that are exposed on the backplane. The client interface 550 may be provide support for the hybrid services line module 500 to communicate with client services, and provide support various client-side optical and electrical signals. For example, the client interface may support a variety of Ethernet signals (e.g., an Ethernet Services Line Module (ESLM) may support client services such as 10 GbE, 100 GbE, NxGbE, etc.). The client interface 550 may include address, control, and/or data connections to enable appropriate communications on the network. Moreover, the hybrid services line module may communicate with the control module over a control plane using the backplane connection. For example, the control plane may include OSRP, ASON, G-MPLS, or the like. It may perform many functions such as automatic resource discovery, distributing network resource information, establishing and restoring connections dynamically across the network, and the like. However, the present disclosure is not limited to OSRP, as other intelligent signaling and routing protocols that can (or can be modified to) provide similar functionality as OSRP (e.g., automatically establishing and restoring connections across the network, and the like) may be used.

The memory 520 may be used to store data, such as control plane information received from other nodes, and/or their control modules, etc. The memory 520 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory 520 may incorporate electronic, magnetic, optical, and/or other types of storage media. Note that the memory 520 may have a distributed architecture, where various components are situated remotely from one another, but may be accessed by the processor.

Figure 6:
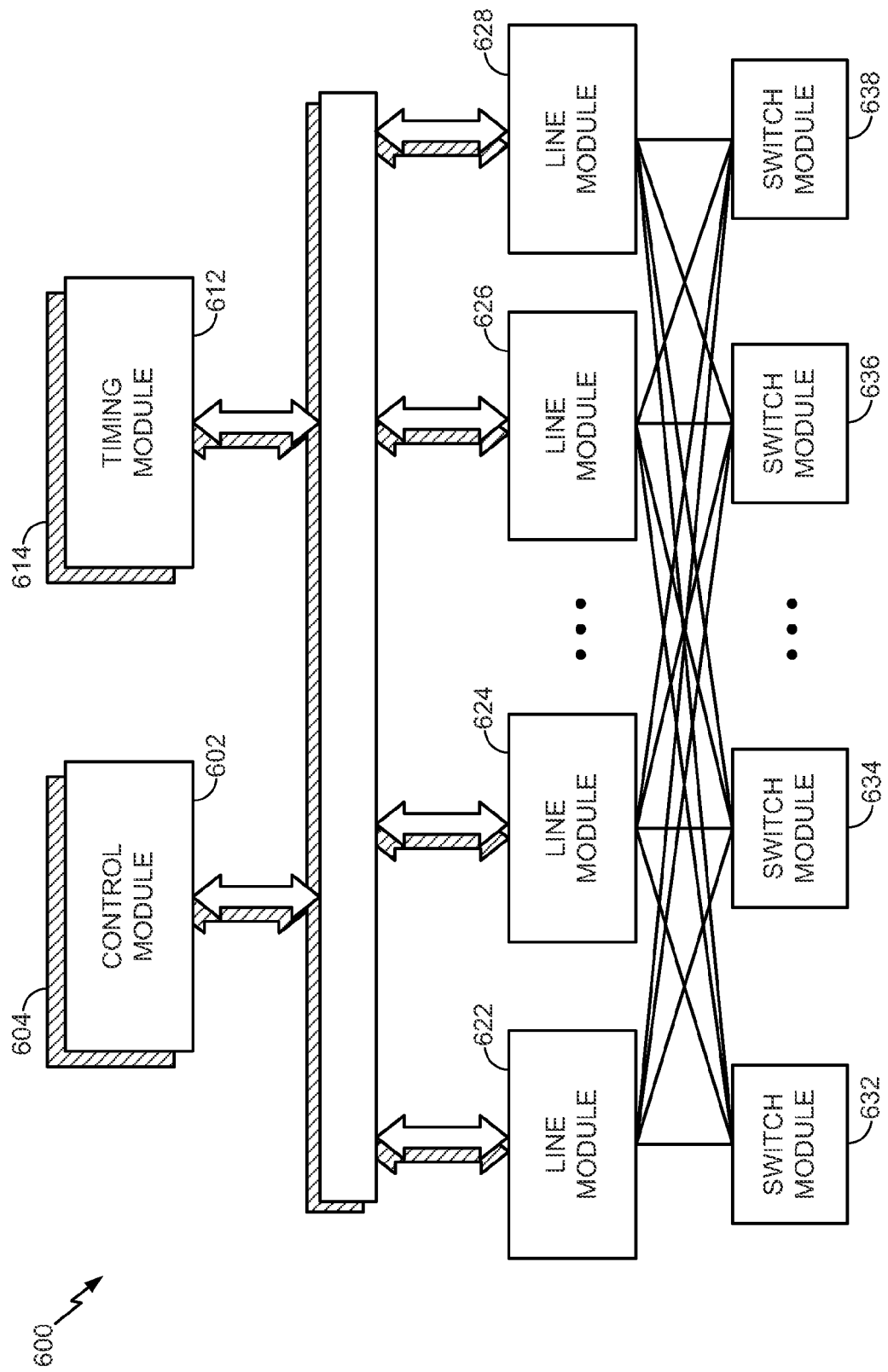
FIG. 6 illustrates an exemplary software-based control hierarchy that may be implemented in a node that provides port level protection for a hybrid network interface.

FIG. 6 is a block diagram of illustrating a software-based control hierarchy 600 implemented in an embodiment of the node 300. The control software may be architected as collection of functional blocks distributed throughout processors on control modules 602, 604, line modules 622-628, and timing modules 612, 614. As noted above, the node 300 may include a plurality of control modules 602, 604, which may serve as the central system controllers on node 300. At a given time, only control module 602 may be active and the other control module(s) 604 (shown in dark shading) are in a stand-by mode to be used if a failure occurs in the active control module 602. As noted above, the control modules 602, 604 may configured by the management system 304, which may provision the node 300 using a network management system (NMS), an element management system (EMS), a command line interface (CLI), a Simple Network Management Protocol (SNMP) interface, or another suitable element management interface. A processor (e.g., processor 415 in FIG. 4) may run element management code, signaling and routing, equipment management, a persistence service, intra-switch communication, and system integrity code. The element management code may include Common Object Request Broker Architecture (CORBA) code, TL1 agent code, or other suitable element management code. Based at least in part upon provisioning instructions received from the management system 304, the control module may execute software for management, call processing, signal routing, and provisioning sub-network connections.

The node 300 may include a plurality of timing modules 612, 614 that may perform the network timing and switch fabric synchronization for the system, particularly with respect to SONET Layer 1 connections. One timing module 612 may be primary, while the other timing module 614 may be used in the event of a failure of the primary timing module. The timing modules 612, 614 may include a reference timing source (e.g., Stratum 3E level source) and associated software.

The line modules 622-628 may include client-side line modules for providing various client services, and transport-side modules for interfacing with the transport network (WAN). The processor in the line modules 622-628 may execute OTN/SONET/SDH interface code and systems integrity code, and may be responsible for the lower levels of the OTN/SONET/SDH digital communications channel (DCC), and controls optical/Ethernet modules and switch modules 632-638. One or more of the line modules 622-628 may be a hybrid services line module (such as, for example, an ESLM). Accordingly, based on commands from the EMS, the control modules 602, 604 may provide the appropriate hybrid services line modules 622-628 with instructions for provisioning various functions (e.g., LAGs) to provide port-level protection of any hybrid services line module. The provisioning may occur within the hybrid services line module themselves, and additionally, these modules may pass along further provisioning instructions to the switch modules 632-638 (e.g., for creating the virtual connection points, L1 switches, etc., as will be explained below in description of FIG. 7 and FIG. 8).

The switch modules 632-638 may include a plurality of switches reserved for redundancy in case of failure. The switch modules may be configured directly by the line modules 622-628, and may not communicate directly with the active control module 602 as the switch modules 622-628 do not include a local general purpose processor.

Figure 7:
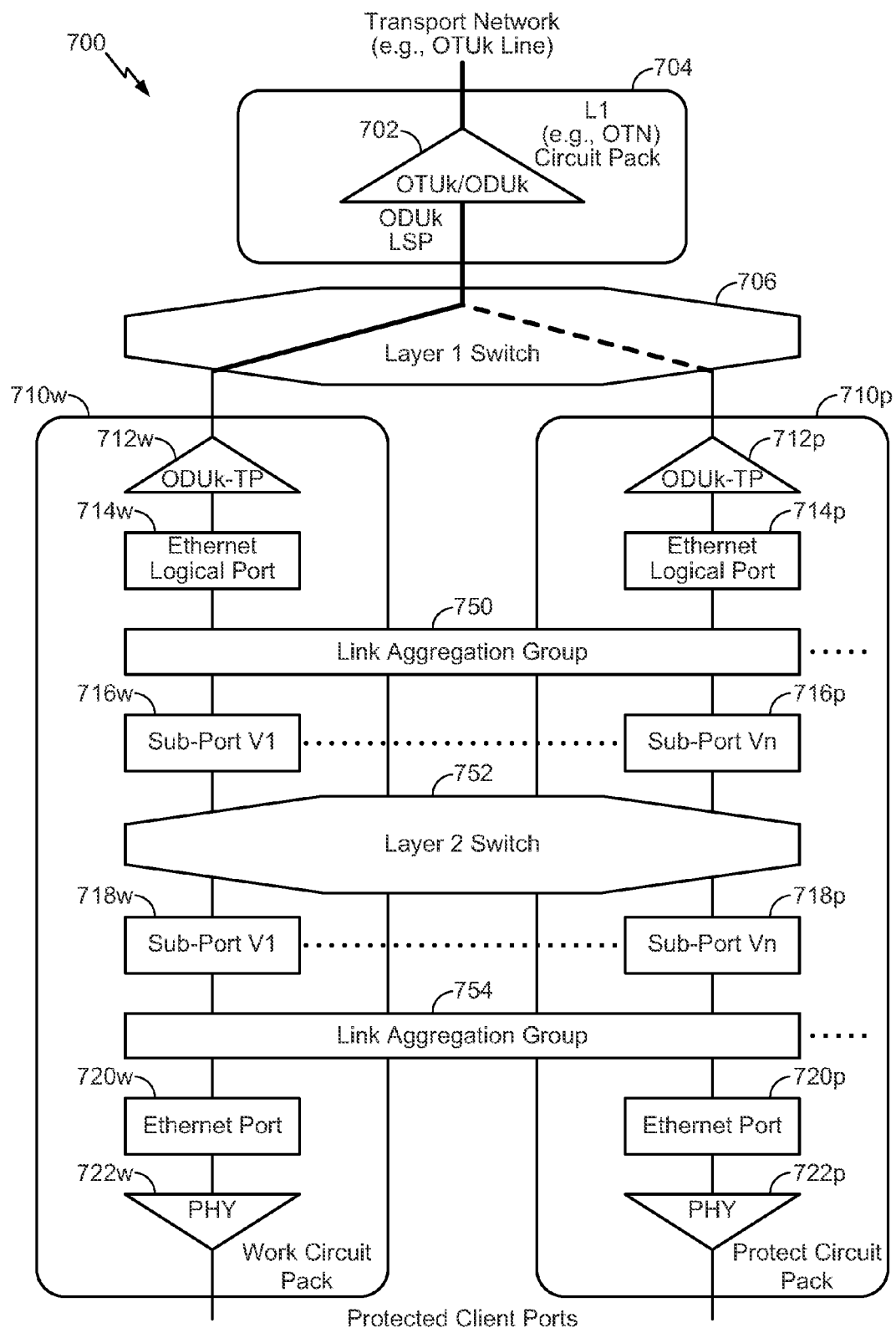
FIG. 7 illustrates an exemplary data plane model that may be used to implement port-level protection on hybrid equipment.

FIG. 7 is a flow diagram illustrating a data plane model 700 exemplifying functional blocks for implementing port-level protection on hybrid equipment. Some of the functional blocks may be aggregated into groups called "circuit packs" for performing higher level networking and protection functions. Each of the functional blocks and circuit packs may be specified and configured in software (e.g., an Element Management System) by a node manager (e.g., management system 304).

The data plane model 700 may include an L1 circuit pack 704 directed to Layer 1 operation (e.g., an OTN circuit path). The data plane model 700 may also include a plurality of protection circuit packs 710 directed to hybrid Layer 1/Layer 2 operations for protecting both the backplane Layer 1 termination points (e.g., ODUk termination points) and the client-side ports. The protection circuit packs 710 may divided into work circuit packs 710w and protect circuit packs 710p. As used herein, a reference number appended with a "w" will be directed to a reference associated with the work circuit pack (e.g., "710w"), and a reference number appended with a "p" will be directed to a reference associated with the protect circuit pack (e.g., "710p"). When a reference number shown in FIG. 7 is described herein without its appended letter (i.e., presented in the specification as a "base reference number"), the description applies to both work and protect circuit packs associated the common base reference number.

The L1 circuit pack 704 may include a connection point 702 which prepares traffic to be sent to and received from the transport network. For example, ODUk frames which will be sent the transport network will be transformed from ODUk frames to OTUk frames prior to being sent; and frames received from the transport network will be transformed from OTUk frames to ODUk frames after being received. The L1 circuit pack 704 may be functionally coupled to a Layer 1 switch 706 with a single L1 traffic path. The Layer 1 switch 706 may serve as a bridge/select connection which bi-casts traffic to both work circuit pack 710w and the protect circuit pack(s) 710p. As will be described in more detail in the description of FIG. 8, the Layer 1 switch 706 may be realized in the L1 switch fabric of switch module 330 as a Virtual Connection Point (VCP).

In general, a Virtual Connection Point may be a logical object that can be defined and maintained in software (e.g., an EMS) which establishes a connection between real network resources, as well as other logical objects. The VCP may have a point of input selection. Due to its unidirectional nature, the VCP may act as a source connection point for multicasting. In addition to providing bridging/selection functionality as described above, virtual connection points can flexibly be configured to act as 1) origination points for other virtual connection points or termination points (TPs) in a cross-connect; 2) termination points for other virtual connection points or origination points in a cross-connect; 3) origination points for a multicast set of connections; 4) an intermediate point within the cross-connect for the addition of new connections; 5) selectors for two or more inputs; and 6) selectors for two or more inputs and as an origination point for a multicast set of connections.

Further referring to FIG. 7, the functional blocks having the same labels and base reference numbers within the work and protect circuit packs 710 may be the same in terms of functionality, but can be implemented across a plurality of different modules within node 300. These modules may include the hybrid services line modules 500 and/or switch modules 300. Moreover, the functional blocks within any particular protect circuit pack 710p may typically be spread across more than one active modules to improve reliability, while at the same time avoiding having to dedicate a "hot spare" to a particular protect circuit pack 710p. For example, in one embodiment, a Layer 2 switch 752 may be shared across the hybrid services line modules 500 (e.g., in the first stage of a three-stage Clos fabric) and the Layer 2 switch 752 may be further shared across the switch modules 300 (e.g., in the center stage of the three-stage Clos fabric). As such, the Layer 2 switch 752 may provide any-to-any connectivity between ports for Layer 2 services and redundancy.

Any work/protect circuit pack 710 may include backplane L1 termination points such as ODUk-TPs 712, which may interface to the Layer 1 switch 706 over the backplane connection. The ODUk-TPs 712 may be mapped to Ethernet logical ports 714, so they may be protected using a first Link Aggregation Group 750. The first Link Aggregation Group may interface to the Layer 2 switch 752 through a Sub-Port Vi 716, which may provide a logical interface that can be used to subdivide a logical port (e.g., based on an arbitrary classification) and thereby map multiple ports to a logical port. For example, in one embodiment, one or more virtual local area networks (VLANs) may be assigned to the Sub-Port Vi 716, which may further have additional Access (ACL) or quality of service (QoS) flow sub-classifications to further meter or block the sub-flows of the Sub-Port Vi 716. Accordingly, each L1 termination point (e.g., ODUk-TP 712 interface) may be associated with a logical port and sub-ports attached to the Ethernet switch. In this respect, the ODUk-TP 712 may be treated in the same manner as an Ethernet physical termination point. In various embodiments, multiple sub-ports can be mapped to given logical port, classifying traffic based on VLAN or some other value determining the forwarding rules. The link aggregation may form a 1+1 LAG with a single work and single protect member (LACP disabled).

The Layer 2 switch 752 may interface to a second Link Aggregation Group 754 through Sub-Port Vi 718. The second Link Aggregation Group 754 serves to protect the client-side ports, which may be defined by Ethernet port 720 along with its associated termination point 722.

Figure 2:
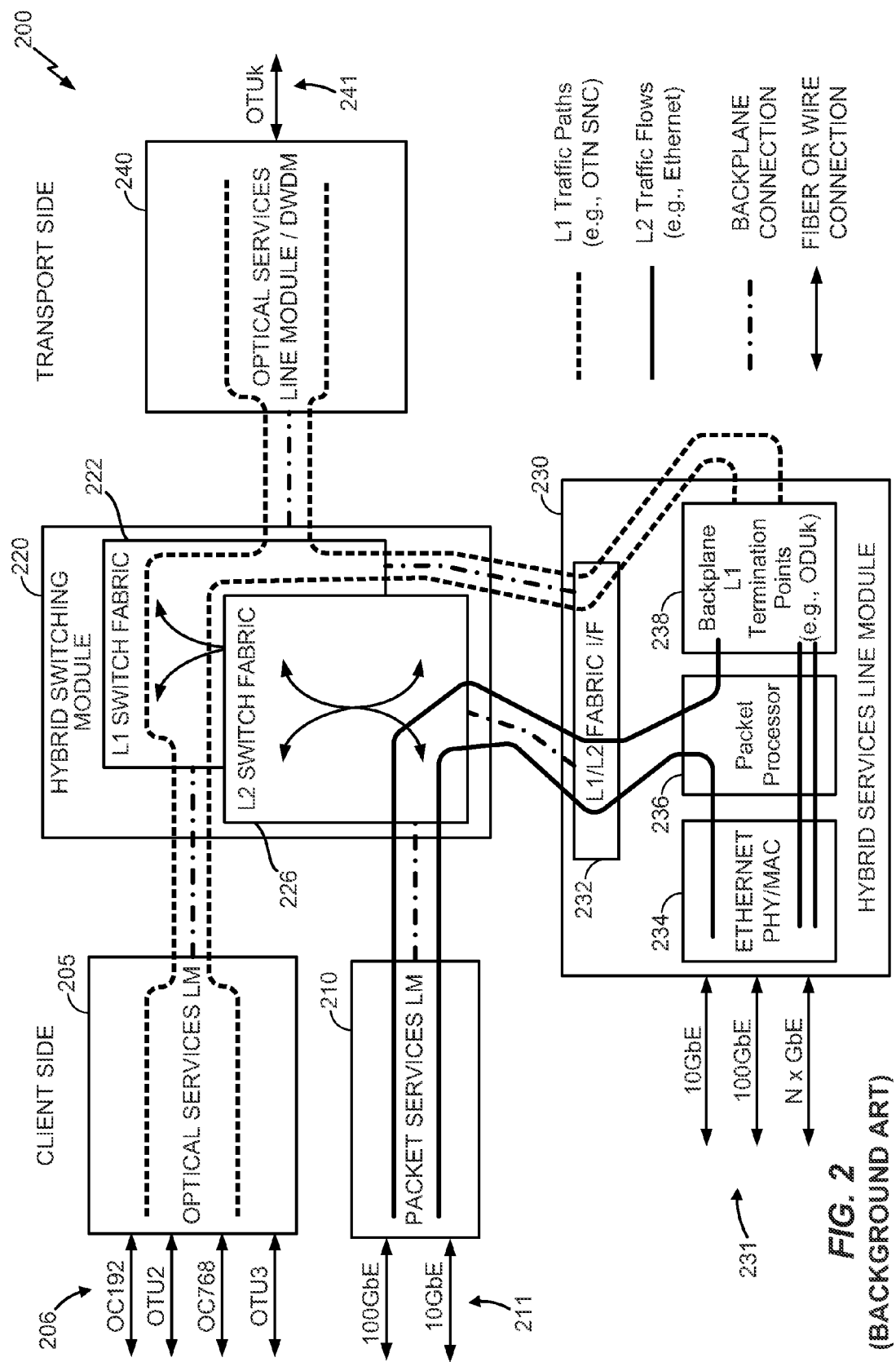
FIG. 2 illustrates an exemplary node that may function as a dual-purpose switch that can perform networking functions at different layers.

In one embodiment, the functionality of the ODUk-TPs 712, the Ethernet logical ports 714, and/or the Sub-Ports Vi 716 may be realized in one or more hybrid services line modules 500 or in a standard client-side line module (e.g., on a typical Layer card such as line modules 205, 210 in FIG. 2). Furthermore, in one embodiment, the Layer 2 switch 752 may be realized in one or more control modules 400. For example, the work and protect members of the LAG can reside on any hybrid services module 500 in the system.

Under normal operation, the work circuit pack 710w will bear the active traffic, and the protect LAG member circuit packs 710w will be in a standby mode, and thus not transfer any traffic (either collecting or distributing frames to/from the ODUk interfaces). The Layer 1 switch 706 may be configured as an SNCP bridge/select connection which can be provisioned in the L1 switch fabric, providing a cross-connect to the transport network-side (e.g., an OTUk line). Traffic may be bi-casted to both the work and protect logical ports, and selected from the working port. The L1 circuit pack 704 does not have to be reconfigured with any additional L1 Traffic Paths (e.g., ODUk Label Switched Paths and/or OTUk trunks), nor does the transport network require any additional trunks to provide LAG protection for the hybrid services line module 500.

In one embodiment, an equipment fault management sub-system may monitor the health of the Work and Protect circuit packs. As such, when the equipment fault management sub-system determines that a circuit pack has failed, the Layer 1 switch/selector 706 switches to the protecting logical port, and the link aggregation state of the protect port changes to SELECTED. In one embodiment, a control module 400 may generally run the equipment fault management sub-system or otherwise perform the fault management. However, those skilled in the art will appreciate that the equipment fault management sub-system or other components that perform the fault management may be external to the node 300 (e.g., implemented in management system 304).

The Layer 1 traffic path (e.g., the OTN SNC or LSP) in the L1 circuit pack 704 can be set up with the Element Management System via a control plane and be protected in a number of ways (e.g., OSRP mesh protection) which would not require redundant trunks into transport network/WAN, which a typical Link Aggregation Group can require. Note that L1 circuit pack may utilize either GMPLS (LSPs) or Ciena OSRP (SNCs). Moreover, aspects are not limited to OTN and can be implemented for SONET/SDH backplane interfaces as well. Embodiments can also be implemented on other network layers, such as, for example, a hybrid L2/L0 photonic switch running control plane at Layer 0, where ODUk SNCs are replaced with wavelengths at Layer 0.

Figure 8:
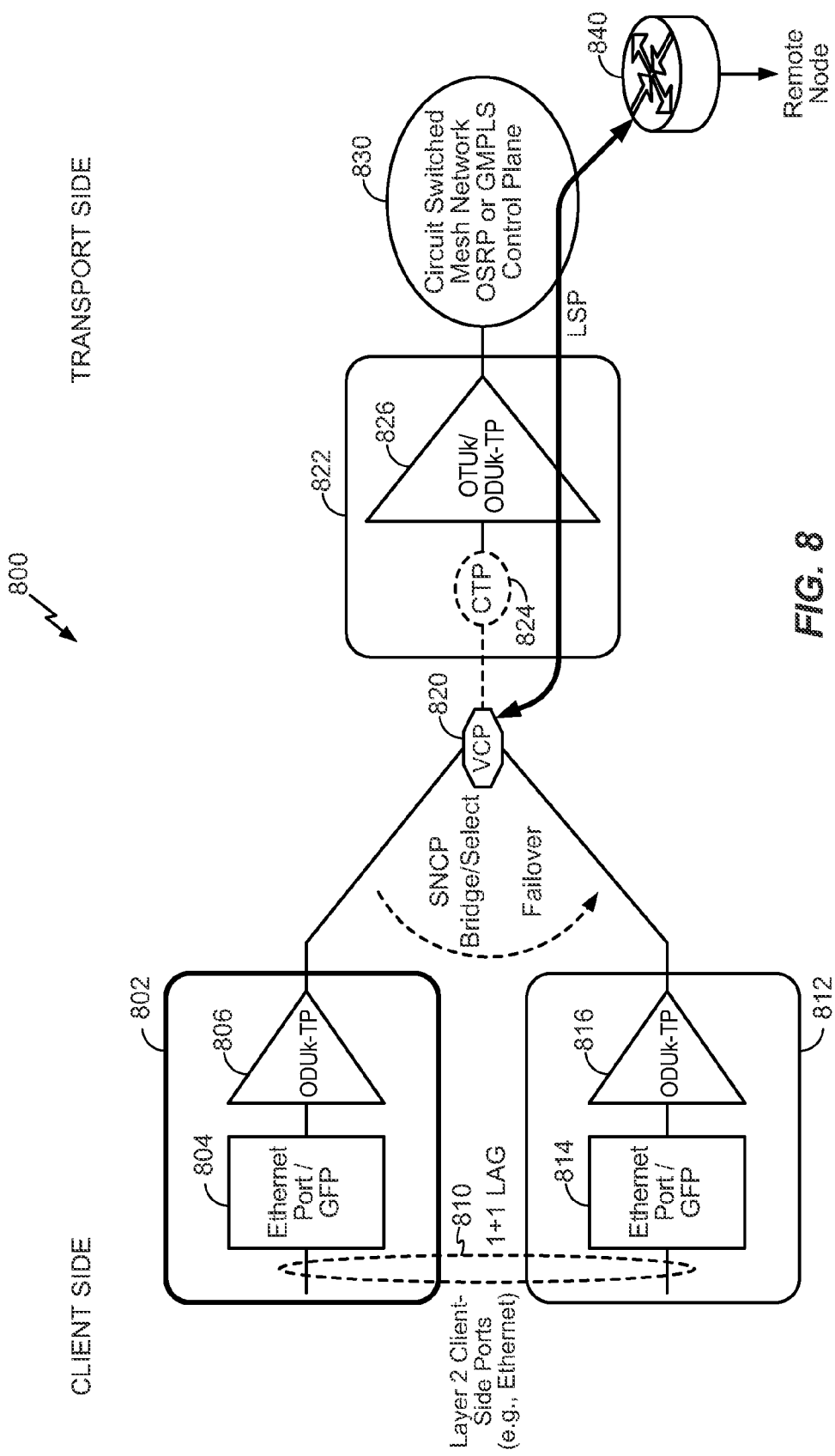
FIG. 8 illustrates an exemplary node that may utilize a Virtual Connection Point as a Layer 1 bridge/select connection and termination point of a Layer 1 traffic path.

FIG. 8 is a block diagram of a node 800 utilizing a Virtual Connection Point (VCP) as the Layer 1 bridge/select connection and termination point of the Layer 1 traffic path (e.g., OTN SNC). Node 800 includes the work and protect members of the Link Aggregation Group 810, where a work member may include work client-side line module 802 and the protect member may include protect client-side line module 812. Only a portion of the work client-side line module 802 and the protect client-side line module 812 is shown, which illustrates the Layer 1 backside termination points 806 and 816 (e.g., ODUk-TP), and the logical Ethernet ports 804 and 814. The Layer 2 client-side ports are protected, for example, with the (1+1) LAG 810.

The Virtual Connection Point (VCP) 820 may provide the bridge/select function and may act the Connection Termination Point (CTP) 824 (e.g., an SNC/LSP termination point). The Layer 1 traffic path (e.g., SNC/LSP), which includes transport-side line module 822 having Layer 1 backside termination points 826 (e.g., ODUk/ODUk-TP), transport network 830, and router 840, remains operational and is undisturbed during any equipment protection switching events on the client-side hybrid line modules.

The VCP may be established in the switching module 330, and can be attached to the common leg of a SNCP bridge/selector, or the VCP can provide the bridge/select function for equipment protection. In either case, the VCP provides a termination point for the Layer 1 traffic path (e.g., OTN SNC or LSP tunnel). The Layer 1 traffic path, such as an OTN SNC and/or LSP, can be set up via the control plane and protected in a number of ways, such as using Optical Signal Routing Protocol (OSRP) mesh protection. As noted herein, the Layer 1 traffic paths may be realized with Generalized MultiProtocol Label Switching (GMPLS) Label Switched Paths (LSPs) and/or Ciena OSRP Subnetwork Connections (SNCs). Furthermore, the VCP 820 may be considered a floating endpoint, and can be realized in the center stage of a three-stage Clos fabric in the switching module 330, where it performs bridging/selector functions to/from any of the back-plane connection points on the line cards. So in the event of a line card failure the VCP is not affected, and since redundancy is designed into the switch fabric, the node 300 is resilient to center stage switch module 330 failures as well.

Utilizing the combination of Layer 2 Link Aggregation Points and the Layer 1 bridge/select functionality, equipment failures can be mitigated on a hybrid packet/optical switch at port level granularity without requiring redundant tunnels into the transport network. The node 800 may achieve fast switching (less than 50 ms) for backplane ports while maintaining Layer 1 traffic path (e.g., SNC/LSP) connectivity. On the transport network-side, mesh restoration remains unaffected for Layer 1 traffic paths (e.g., SNC/LSP) and can be isolated from equipment protection on node 800.

Figure 9:
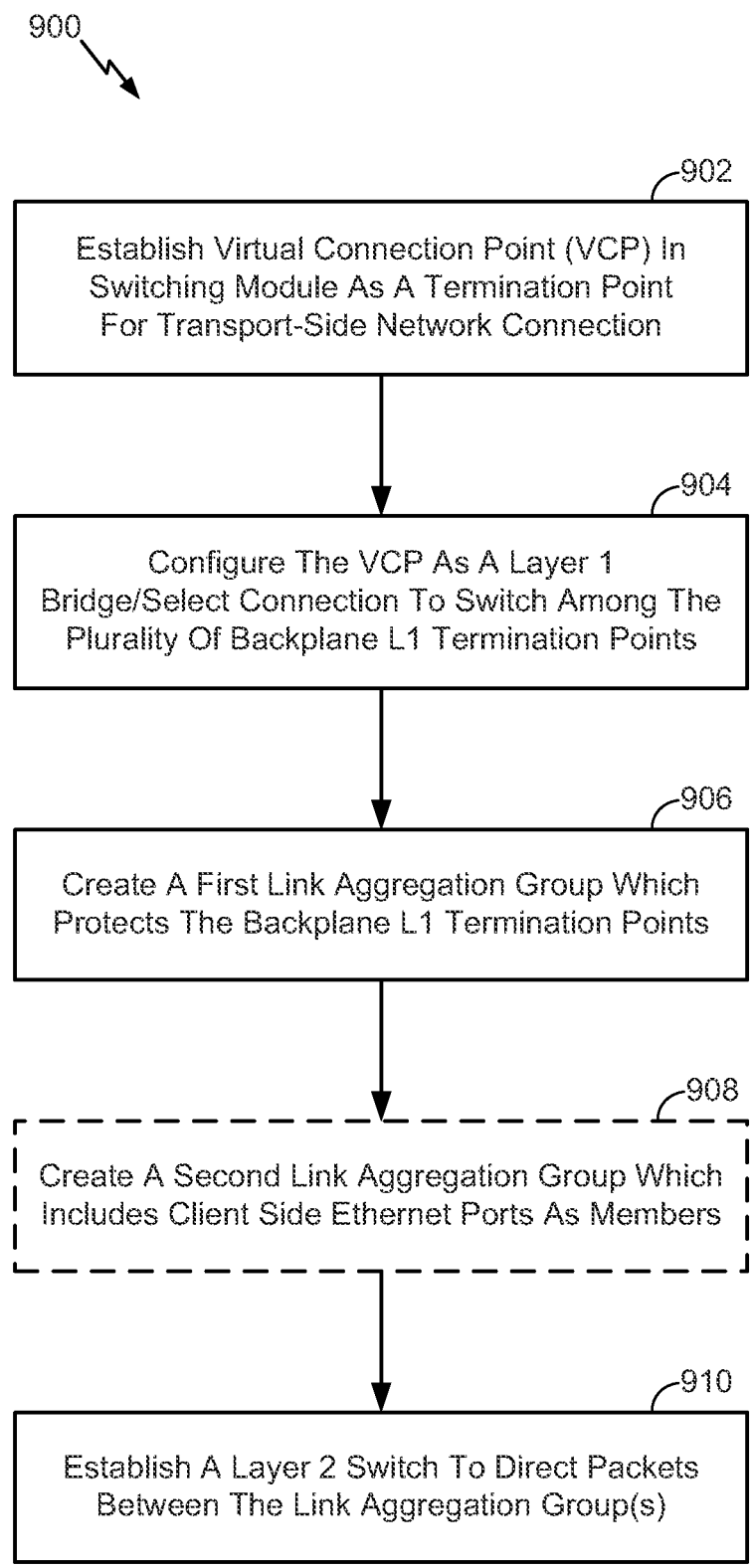
FIG. 9 illustrates an exemplary method for configuring a hybrid services line module that may provide port level protection for a hybrid network interface.

FIG. 9 is a flowchart illustrating an exemplary method 900 for configuring a hybrid services line module (500) for providing port level protection.

The method may initially establish a Virtual Connection Point (VCP) as a termination point for a transport-side network connection (902). The VCP may then be configured as a Layer 1 bridge/select connection to switch among any one of a plurality of backplane L1 termination points (904). Both blocks 902 and 904 may be accomplished by having the hybrid services line module 500 pass along configuration commands to the switching module(s) 300 to realize the VCP in the Layer 1 switch fabric.

The method may create a first link aggregation group which protects the backplane L1 termination points (906), and may optionally further create a second link aggregation group which includes client-side Ethernet ports as members (908). For example, in one embodiment, creating the second link aggregation group at block 908 may be optional because all of the interfaces/ports on the hybrid card could be backplane interfaces, in which case the only link aggregation groups are on the backplane. A Layer 2 switch may then be established to direct packets between the link aggregation groups (910), which include the first link aggregation group created at block 906 and which optionally includes the second link aggregation group if created at block 908. Block 910 may be accomplished by having the hybrid services line module 500 pass along configuration commands to the switching module(s) 300 to realize the switch functionality in the Layer 2 switch fabric.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for providing port level protection for a hybrid interface, comprising:
   establishing a Virtual Connection Point (VCP) as a termination point for a transport-side network connection;
   configuring the VCP as a Layer 1 bridge/select connection to switch among any one of a plurality of backplane Layer 1 termination points;
   creating a link aggregation group to protect the plurality of backplane Layer 1 termination points, wherein the link aggregation group is configured between modules and over a backplane within a node, and wherein the link aggregation group comprises a first link aggregation group;
   establishing a Layer 2 switch to direct packets between the link aggregation group and the VCP configured as the Layer 1 bridge/select connection; and
   creating a second link aggregation group to protect one or more client-side Ethernet ports, wherein the Layer 2 switch further directs packets between the first link aggregation group and second link aggregation group, and wherein the second link aggregation group is configured between the node and another device,
   wherein the first link aggregation port is between the Layer 2 switch and a Layer 1 switch fabric and the second link aggregation port is between the Layer 2 switch and the one or more client-side Ethernet ports.

2. The method of claim 1, further comprising:
   assigning logical Ethernet ports to Layer 1 termination points, wherein members in the link aggregation group include the assigned the logical Ethernet ports to protect the backplane Layer 1 termination points.

3. The method of claim 1, wherein the backplane Layer 1 termination points comprise Optical Transport Network (OTN) termination points and the OTN termination points comprise Optical Data Unit (ODUk) termination points.

4. The method of claim 1, wherein the backplane Layer 1 termination points comprise one or more of Synchronous Optical Networking (SONET) termination points or Synchronous Digital Hierarchy (SDH) termination points.

5. The method of claim 1, wherein the VCP is established in the Layer 1 switch fabric.

6. The method of claim 5, wherein the VCP is realized in a center stage of a three-stage Clos switch.

7. The method of claim 1, wherein the VCP provides a termination point for one or more of a Subnetwork Connection (SNC) or a Label Switched Path (LSP) tunnel.

8. The method of claim 1, wherein the link aggregation group is single-ended and lacks a far-end peer.

9. The method of claim 8, wherein the link aggregation group runs in a link aggregation group (1+1) configuration.

10. A node for providing port level protection for a hybrid interface, comprising:
    at least one control module;
    at least one switching module having switch fabrics that can independently function at both Layer 1 and Layer 2;
    at least one hybrid services line module functionally coupled to the at least one control module and the at least one switch module through a backplane, wherein each of the control module, the switching module, and the hybrid services line module is a hardware module in the node; and
    at least one processor configured to
    establish a Virtual Connection Point (VCP) in the at least one switching module as a termination point for a transport-side network connection,
    configure the VCP as a Layer 1 bridge/select connection to switch among any one of a plurality of backplane Layer 1 termination points,
    create a link aggregation group to protect the backplane Layer 1 termination points, wherein the link aggregation group comprises a first link aggregation group,
    establish a Layer 2 switch to direct packets between the link aggregation group and the VCP configured as the Layer 1 bridge/select connection, and
    create a second link aggregation group to protect one or more client-side Ethernet ports;
    wherein the link aggregation group is configured between the at least one switching module and the at least one hybrid services line module over a backplane within the node, wherein the Layer 2 switch is further configured to direct packets between the first link aggregation group and second link aggregation group, and wherein the second link aggregation group is configured between the node and another device, and
    wherein the first link aggregation port is between the Layer 2 switch and a Layer 1 switch fabric and the second link aggregation port is between the Layer 2 switch and the one or more client-side Ethernet ports.

11. The node of claim 10, wherein the at least one processor is further configured to:
    assign logical Ethernet ports to Layer 1 termination points, wherein members in the link aggregation group include the assigned logical Ethernet ports to protect the backplane Layer 1 termination points.

12. The node of claim 10, wherein the backplane Layer 1 termination points comprise Optical Transport Network (OTN) termination points and the OTN termination points comprise Optical Data Unit (ODUk) termination points.

13. The node of claim 10, wherein the backplane Layer 1 termination points comprise one or more of Synchronous Optical Networking (SONET) termination points or Synchronous Digital Hierarchy (SDH) termination points.

14. The node of claim 10, wherein the VCP is established in the Layer 1 switch fabric.

15. The node of claim 14, wherein the VCP is realized in a center stage of a three-stage Clos switch.

16. The node of claim 10, wherein the VCP provides a termination point for one or more of a Subnetwork Connection (SNC) or a Label Switched Path (LSP) tunnel.

17. The node of claim 10, wherein the link aggregation group is single-ended and lacks a far-end peer.

18. The node of claim 17, wherein the link aggregation group is configured to run in a LAG (1+1) configuration.

* * * * *